(12) United States Patent
Horst

(10) Patent No.: US 7,939,982 B2
(45) Date of Patent: May 10, 2011

(54) MOTOR WITH LOBED ROTOR HAVING UNIFORM AND NON-UNIFORM AIR GAPS

(75) Inventor: Gary E. Horst, Manchester, MO (US)

(73) Assignee: Nidec Motor Corporation, St. Louis, MO (US)

( * ) Notice: Subject to any disclaimer, the term of this patent is extended or adjusted under 35 U.S.C. 154(b) by 355 days.

(21) Appl. No.: 12/244,039

(22) Filed: Oct. 2, 2008

(65) Prior Publication Data

US 2010/0084937 A1 Apr. 8, 2010

(51) Int. Cl.
*H02K 21/12* (2006.01)
(52) U.S. Cl. ......... 310/156.56; 310/156.45; 310/156.46; 310/156.47
(58) Field of Classification Search ............. 310/156.44, 310/156.45, 156.46, 156.01; *H02K 21/12*
See application file for complete search history.

(56) References Cited

U.S. PATENT DOCUMENTS

| | | | |
|---|---|---|---|
| 5,675,452 A | 10/1997 | Nigam | |
| 5,701,064 A | 12/1997 | Horst et al. | |
| 6,525,442 B2 * | 2/2003 | Koharagi et al. | 310/156.48 |
| 6,703,745 B2 * | 3/2004 | Chu | 310/156.45 |
| 6,984,270 B2 * | 1/2006 | Sato et al. | 148/103 |
| 7,385,328 B2 * | 6/2008 | Melfi | 310/156.45 |
| 2006/0028082 A1 * | 2/2006 | Asagara et al. | 310/156.53 |
| 2007/0126304 A1 * | 6/2007 | Ito et al. | 310/156.53 |
| 2007/0126305 A1 * | 6/2007 | Okuma et al. | 310/156.53 |
| 2007/0200447 A1 * | 8/2007 | Adaniya et al. | 310/156.53 |
| 2007/0257576 A1 * | 11/2007 | Adaniya et al. | 310/156.53 |

* cited by examiner

*Primary Examiner* — Quyen Leung
*Assistant Examiner* — Thomas Truong
(74) *Attorney, Agent, or Firm* — Senniger Powers LLP

(57) ABSTRACT

A motor having a rotor including first outer surface segments providing uniform air gaps and second outer surface segments providing non-uniform air gaps. The rotor has an outer surface contour comprising a number of first outer surface segments defined by arcs having a first radius centered on a central longitudinal axis and a number of second outer surface segments defined by lines other than arcs having a first radius centered on a central longitudinal axis.

19 Claims, 6 Drawing Sheets

MOTOR WITH LOBED ROTOR HAVING UNIFORM AND NON-UNIFORM AIR GAPS

FIELD OF THE INVENTION

The present invention generally relates to an electric motor. More particularly, the present invention relates to an interior permanent magnet rotor configuration having an outer surface contour which forms segments providing a variable air gap and which forms segments providing a uniform air gap when the rotor is received within a cylindrical opening of a stator.

BACKGROUND OF THE INVENTION

Interior permanent magnet (IPM) rotors using various rotor types are known in the art. For example, in one prior art design as shown in U.S. Pat. No. 5,701,064, a rotor has teeth which form a discontinuous, non-contiguous outer surface contour. Although such designs are useful, there is a need for rotor which provides a more constant power over a wider speed range. In addition, there is a need for a motor having a rotor which provides properties which are properly balanced.

SUMMARY OF THE INVENTION

In one embodiment, a rotor according to the invention includes first outer surface segments providing uniform air gaps and second outer surface segments providing non-uniform air gaps.

In another embodiment, a rotor has an outer surface contour comprising a number of first outer surface segments defined by arcs having a first radius centered on a central longitudinal axis and a number of second outer surface segments defined by lines other than arcs having a first radius centered on a central longitudinal axis.

In yet another embodiment, a motor includes such rotors as noted above. In yet another embodiment, a method of manufacturing such a motor is provided.

Alternatively, the invention may comprise various other methods and apparatuses.

Other objects and features will be in part apparent and in part pointed out hereinafter.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

FIG. 4 illustrates the first radius R1 and FIG. 5 illustrate radius R2.

Corresponding reference characters indicate corresponding parts throughout the drawings.

DETAILED DESCRIPTION OF THE INVENTION

Figure 1:
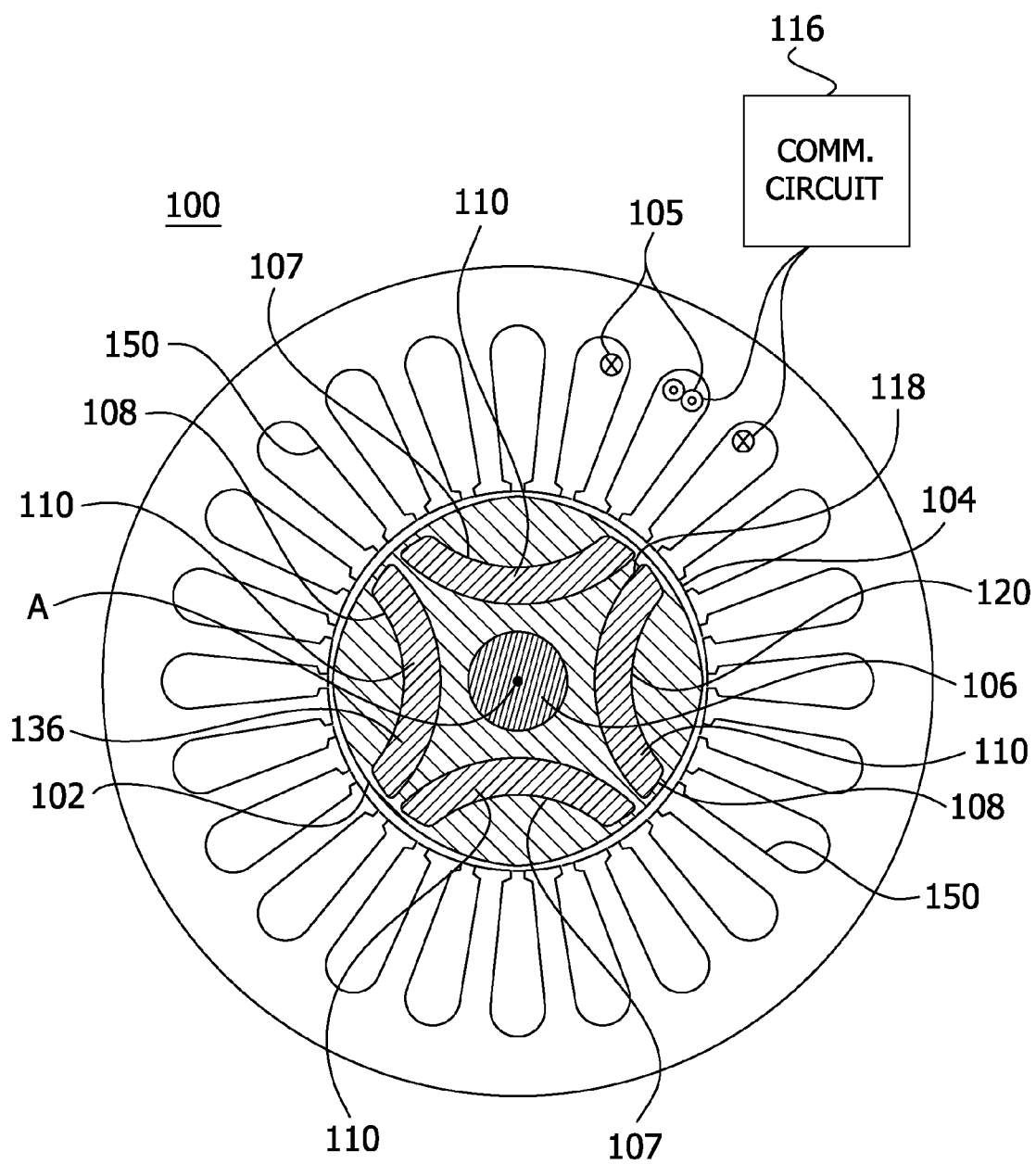
FIG. 1 is a partial cross sectional view perpendicular to an axis of rotation of a motor including a lobed rotor received in a stator according to one embodiment of the invention.
Figure 2:
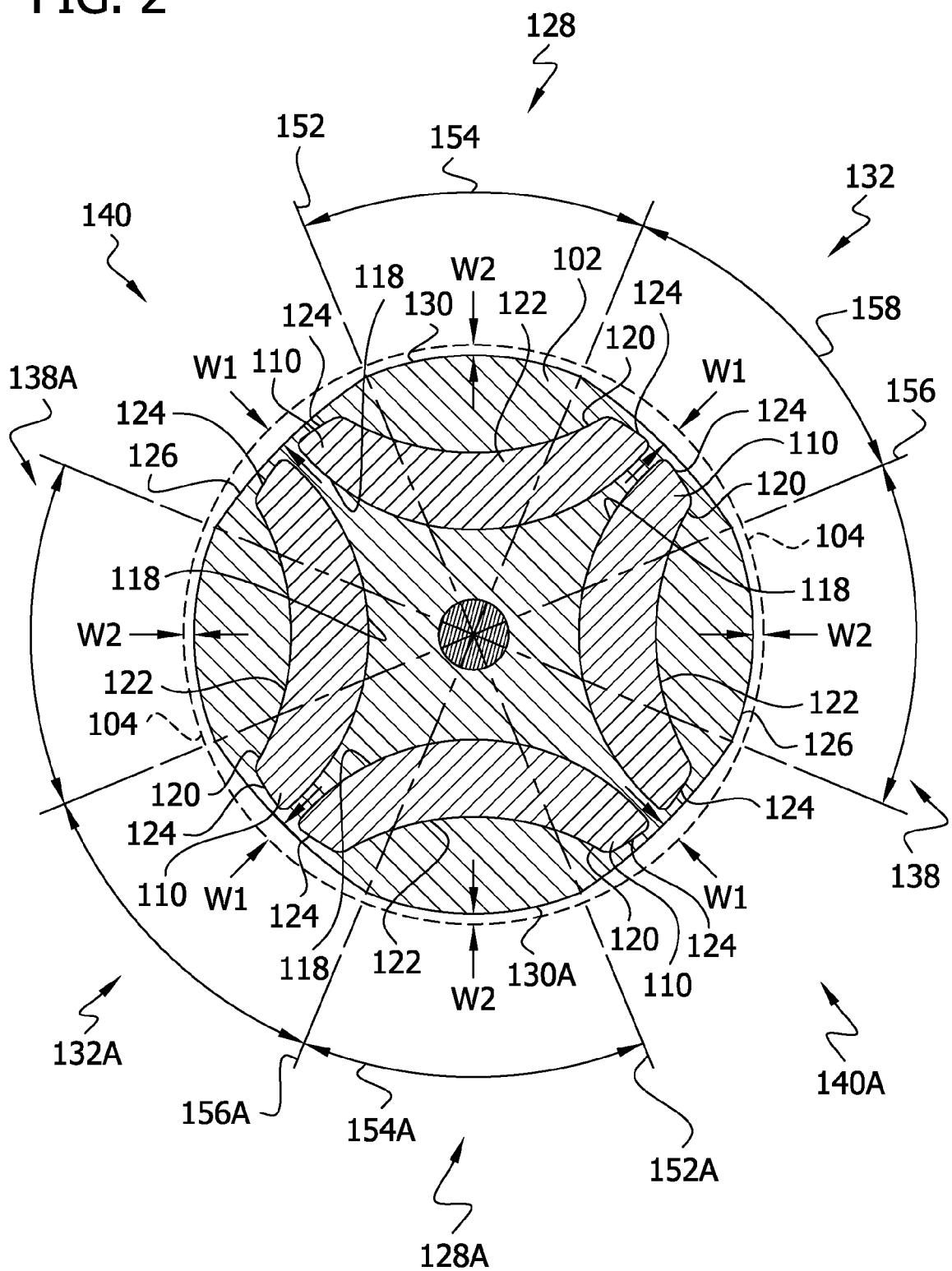
FIG. 2 is a cross sectional view perpendicular to an axis of rotation of a rotor according to one embodiment of the invention having four slots for receiving an arc shaped ferrite magnet which is wider in a middle region.
Figure 3:
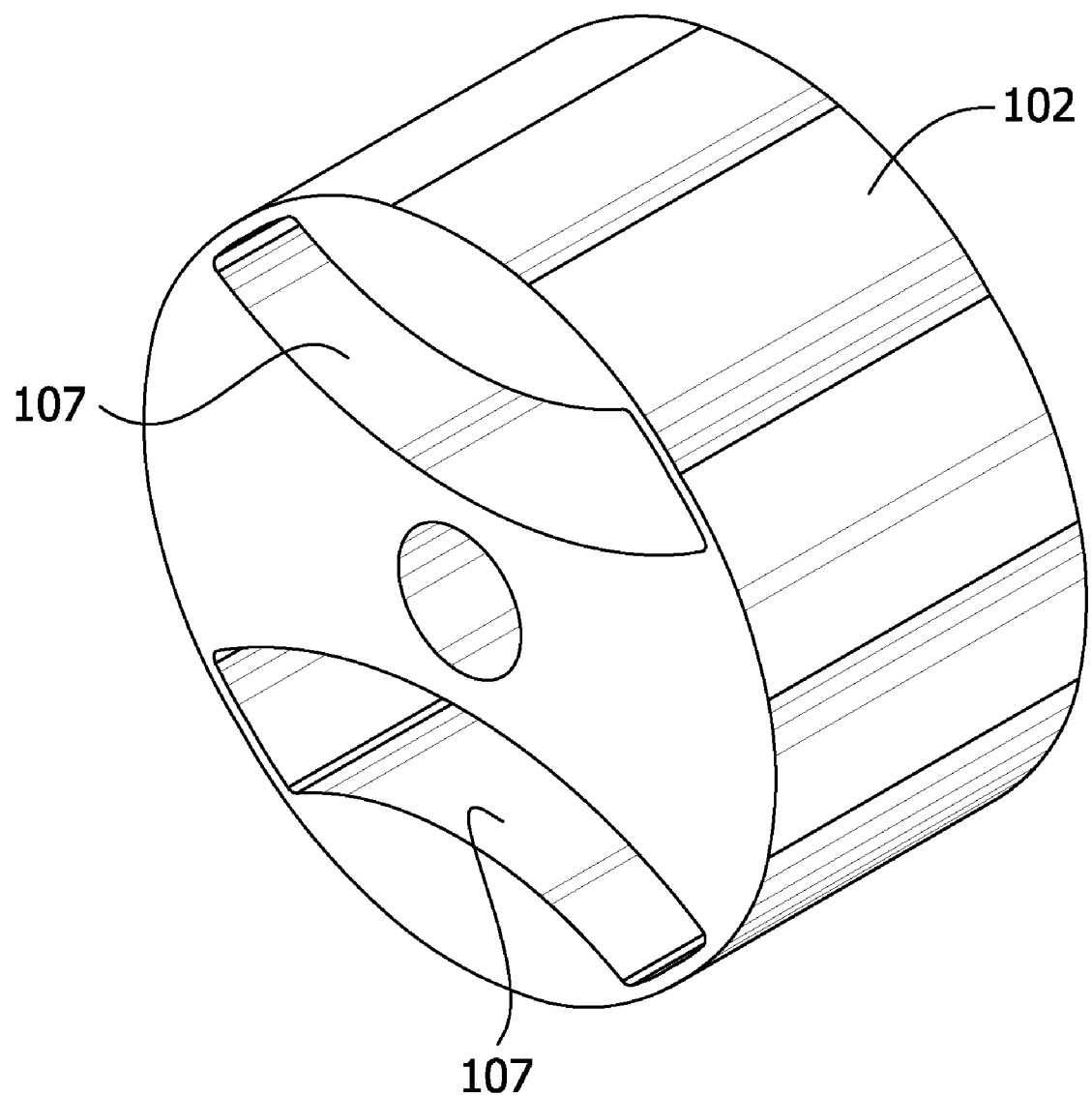
FIG. 3 is a perspective illustration of one embodiment of a rotor of the invention.

Referring to FIGS. 1 and 2, one embodiment of a motor 100 of the invention is illustrated in cross section including a lobed rotor 102 positioned within a stator 104 having windings 105. The lobed rotor 102 forms a core adapted to be received within a cylindrical opening defined by an interior surface of the stator 104 for rotation of the core within the cylindrical opening about a central longitudinal axis A of the core.

The rotor 102 is supported by a central shaft 106 rotating about the central longitudinal axis A. In one embodiment, the rotor 102 comprises a core of steel (or other material) having two sets opposing slots 107, 108 extending parallel to the shaft. The slots 107, 108 are each configured to receive a magnet 110 such as a ferrite magnet. The stator 104 is configured with windings 105 connected to a control circuit 116. The control circuit 116 energizes the windings 105 causing the rotor 102 to rotate about the central shaft 106.

Each magnet 110 comprises an arc shaped ferrite magnet 110. As viewed in cross section of the core (e.g., cross section taken in a plane perpendicular to the central longitudinal axis A), each magnet 110 comprises a radial inner surface 118 (e.g., a convex surface facing axis A) and a radial outer surface 120 (e.g., a concave surface facing away from axis A). Each magnet 110 further comprises a middle region 122 between the radial inner surface 118 and the radial outer surface 120 and two end regions 124 between the radial inner surface 118 and the radial outer surface 120 on opposite sides of the middle region 122 (see FIG. 2). In the embodiment as illustrated in FIG. 2, the middle region 122 is wider in a radial direction than the end regions 124.

In one embodiment, the rotor of FIGS. 1 and 2 is used in an IPM motor with permanent magnets imbedded in the rotor core, made from a stack of laminations. Each lamination includes cutout slots 107, 108 spaced radially outward from the central longitudinal axis A. The laminations are stacked to form the rotor core and magnets 110 are positioned within the slots 107, 108.

The lobed rotor 102 of the invention provides advantages over rotors which are cylindrical by generally providing reduced cogging torque and a more sinusoidal back electromotive force (EMF). This is achieved in part by an outer continuous surface contour 126 as viewed in a cross section of the core taken in a plane perpendicular to the central longitudinal axis A. The outer surface contour 126 includes a number of first outer surface segments 128, 128A defined by first arcs 130, 130A centered on the central longitudinal axis A to provide uniform air gaps between the first outer surface segments 128, 128A and the interior, cylindrical surface of the stator (dashed line 104 in FIG. 2). The rotor 102 also has a number of second outer surface segments 132, 132A configured to provide non-uniform air gaps varying in their radial dimension, which is defined by the second outer surface segments 132, 132A and the interior cylindrical surface of the stator 104. The first and second segments are contiguous.

Each uniform air gap has a gap width W2 which remains substantially constant along an entire length of the air gap (e.g. along segments 128, 128A). In contrast, each non-uniform air gap has a gap width W1 which varies along the length of the air gap (e.g. along segments 132, 132A) from a gap width of W2 to a gap width greater than W2. As shown in FIG. 2, the non-uniform gap width of the second outer surface segment 132, 132A tapers (e.g. decreases) from a gap width W1 at the midsection of segment 132, 132A to a gap width of W2 at segment 128, 128A. In one embodiment, the gap width W2 is half of the gap width W1 at the midsection of segment 132, 132A (e.g., W2=W1/2). Thus, W1 minus W2 is substantially equal to the constant gap width W2 of the uniform air gap within segments 128, 128A (e.g., W1−W2=W2).

It is contemplated in one embodiment that the cylindrical opening of the stator 104 is defined by a plurality of M radially inwardly projecting teeth 150 having a tooth pitch of 360°/M. Each of the first outer surface segments 128, 128A of the rotor 102 defines a first core sector 152, 152A having a first sector angle 154, 154A equal to N.P times the tooth pitch where N is an integer and P=4, 5 or 6 (e.g., the first sector angle=(360°/M)×N.P).

For example, for the stator 104 having 36 teeth (M=36) and letting P=5, N may be 1, 2, 3 or 4 so that N.P may be 1.5, 2.5, 3.5 or 4.5 and the first sector angle may be about 15°, about 25°, about 35° or about 45°, or more, although other sector angles are contemplated.

As another example, for the four magnet rotor 102 of FIG. 2 in combination with the stator 104 of FIG. 1 having M=36 teeth, P=4, 5 or 6, the first sector angle 154, 154A may be in the range of about 14°-16° (N=1), about 24°-26° (N=2), about 34°-36° (N=3) or about 44°-46° (N=4). Also, in the FIG. 2 embodiment, each of the second outer surface segments 132, 132A of the rotor 102 defines a second core sector 156, 156A having a second sector angle 158 of 90° minus N.P times the tooth pitch (e.g., the second sector angle=90°−(360°/M)× N.P)). For example, as shown in FIG. 2, for a stator having M=36 teeth with N=4 and P=5, the first sector angle 154 is illustrated as about 45° and the second sector angle 158 is illustrated as about 45°. In this embodiment, typical values for W1 would be in the range of about 0.030 inches (0.762 mm) to about 0.042 inches (1.067 mm) and typical values for W2 would be in the range of about 0.015 inches (0.381 mm) to about 0.021 inches (0.533 mm).

In order to obtain the desired performance over a wide speed range of constant power, these rotor and motor configurations as described herein, provide a better solution by providing more balanced magnetic properties along the circumference of the rotor 102 as compared to rotors using neo magnets (e.g., neodymium-iron-boron) or neo and ferrite magnets. Furthermore, lobed rotors which provide only varying air gaps and which do not have the first outer surface segments 128, 128A to provide uniform air gaps W2 in combination with the second outer surface segments 132, 132A to provide non-uniform air gaps (e.g., varying to a maximum of W1), as noted above, provide a lower inductance ratio Lmax/Lmin, which is less desirable. Furthermore, cylindrical rotors without lobes result in high cogging and/or harmonics in the back EMF waveform, which is also less desirable as compared to the lower cogging and reduced harmonics of the lobed rotor 102 of the invention. Also, rotors with multiple layers of magnets are more expense than the lobed rotor 102 with magnets 110 because the multiple magnets are more expensive to handle during assembly of the motor.

The rotor structure of the embodiment of FIG. 2 uses four (4) discrete ferrite arc magnets which can be thicker in the middle region 122, and which are in slots which, as noted herein, can be optimized to develop lower cogging, higher inductance ratio Lmax/Lmin and balance of magnet strength for optimizing performance.

Generally, motors employing the invention have a substantially sinusoidal back EMF whereas motors known in the art using ferrite and/or neo magnets have a harmonically rich back EMF. Motors employing the invention generally have a lower minimum inductance than motors known in the art, and the ratio of maximum inductance to minimum inductance is generally higher, which improves the contribution of reluctance torque. Motors employing the invention also generate less noise at high speeds than motors known in the art because there are less total air spaces in the rotor.

Motors employing the invention are generally less expensive to manufacture than those known in the art. Because of their reduced cost, reduced acoustic noise, and reduced electrical noise, motors according to the invention may be advantageously applied in consumer appliances such as horizontal washing machines, dishwashers and clothes dryers.

In the embodiment of FIGS. 3-6, a less complex alternative to FIGS. 1-2 is achieved by using two (2) discrete ferrite magnets instead of using four (4) magnets. Thus, the invention provides a less complex rotor interior for punching during manufacture of laminations.

In one embodiment, there are twice as many second core sectors 156 as first core sectors 152. For example, as shown in FIGS. 3-6, there are four first core sectors 152 of 25° each and eight second core sectors 156 of 32.5° each, totaling 360°.

FIGS. 3-6 illustrate an electric motor rotor 102 having two second outer surface segments 132C, 132D defined by second arcs 160C, 160D not centered on the central longitudinal axis A of the core which arcs define non-uniform air gaps. In particular, each second arc 160C, 160D has a second radius R2 centered at points B and C, respectively, the second radius R2 being less than a first radius R1. In one embodiment, the difference between the first radius R1 of the first arc 130 and the second radius R2 of the second arc 160C, 160D is D1, about 0.087 inches (2.21 mm) or in the range of about 0.075 inches to about 0.099 inches (e.g., about 1.91 mm to about 2.51 mm).

Figure 4:
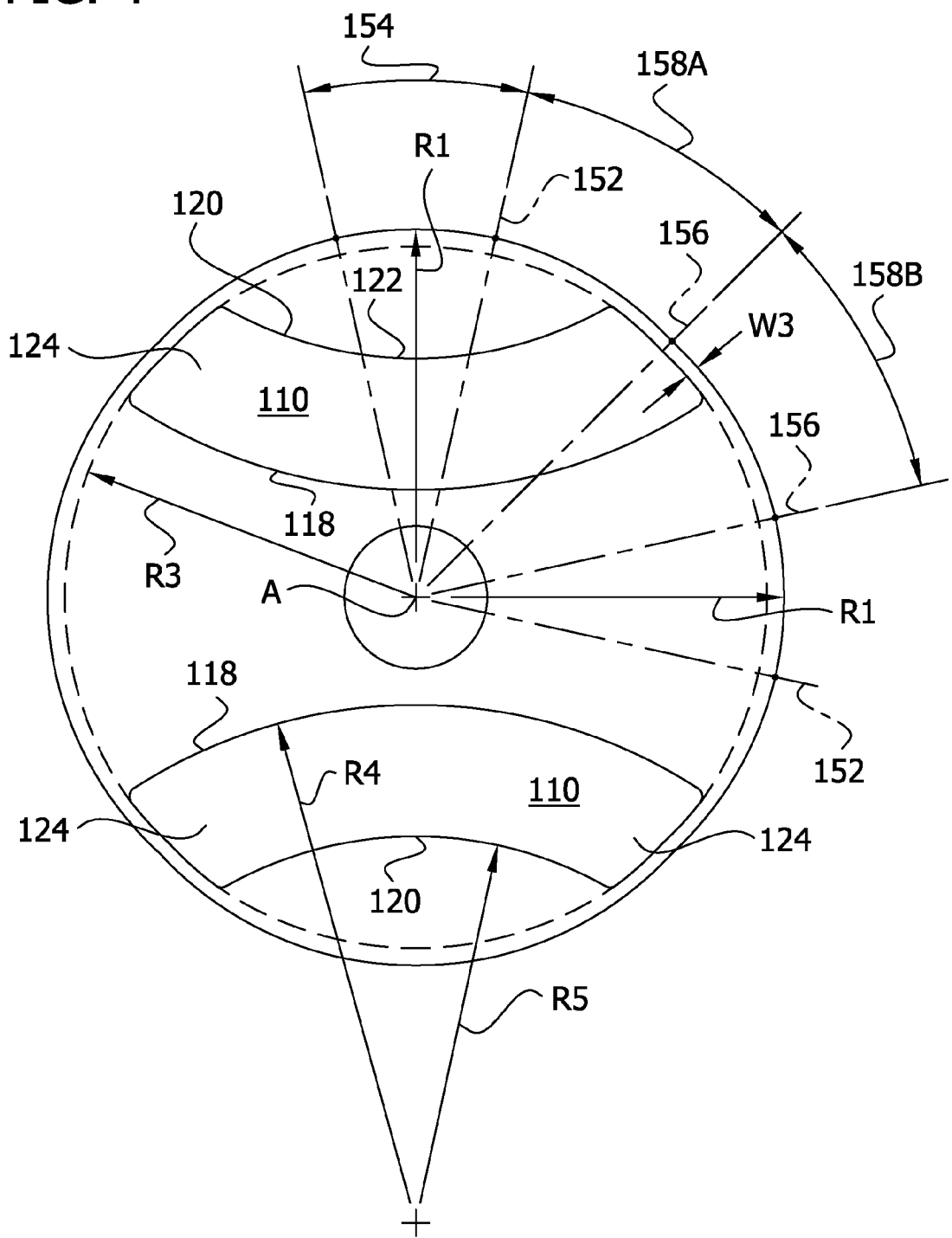
FIGS. 4 and 5 are plan illustrations of one embodiment of a rotor of the invention wherein an outer surface contour comprises a number of first outer surface segments defined by arcs having a first radius R1 centered on a central longitudinal axis and a number of second outer surface segments defined by arcs having a second radius R2 centered on other than the central longitudinal axis.
Figure 5:
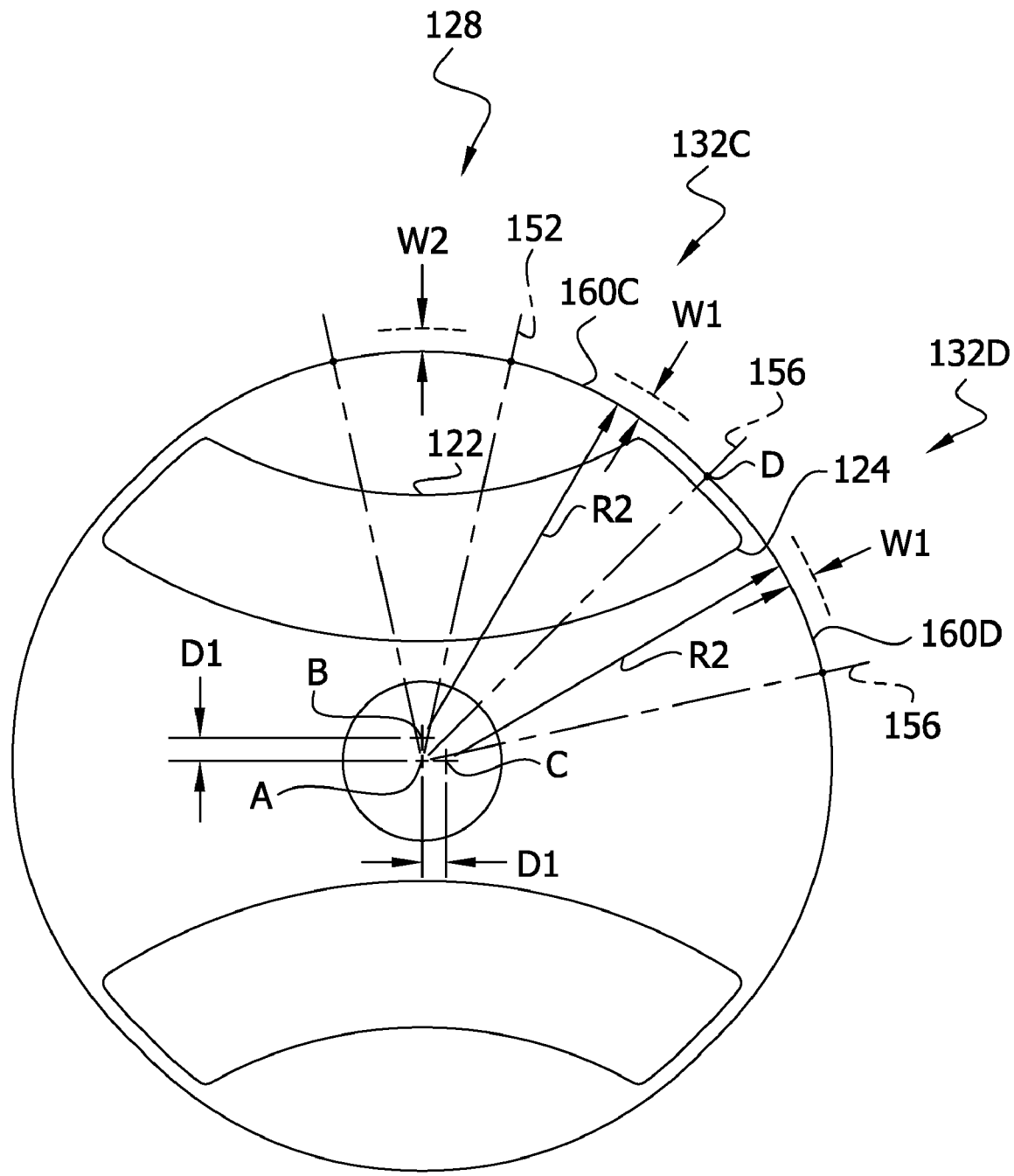
Figure 6:
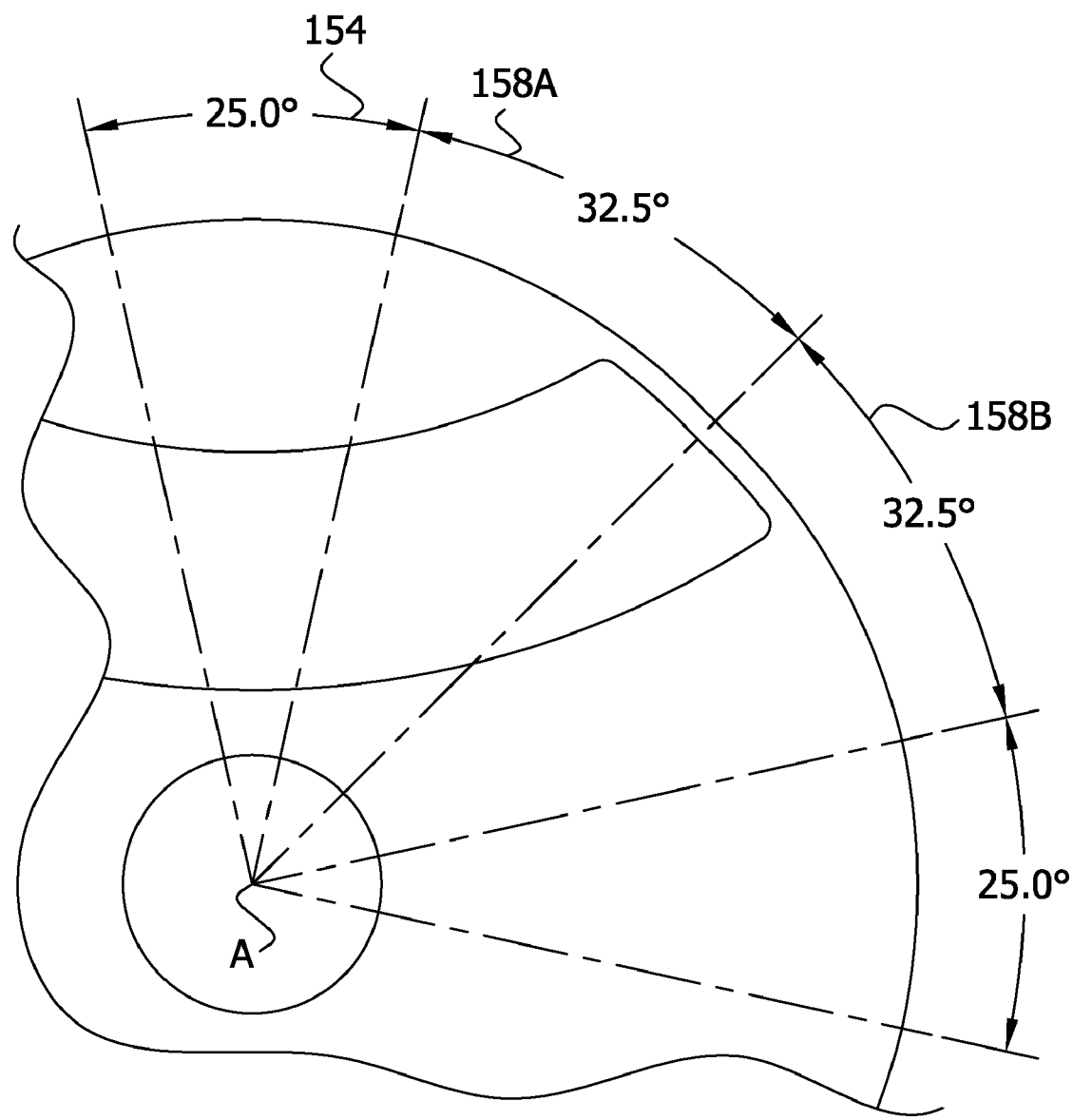
FIG. 6 is a partial enlarged plan illustration of the embodiment of FIGS. 4 and 5 illustrating four (4) sectors.

As an example, as shown in FIGS. 4-6 for a two magnet rotor 102 in combination with the stator of FIG. 1 having M=36 teeth, P=5 and N=2, the first sector angle 154 is 25°. Also, in this embodiment, the second sectors 156 together define an angle of 90° minus N.5 times the tooth pitch (e.g., the total angle of the second sectors=90°−(360°/M)×N.5), or 90°−25°=65°. In this particular example, the first sector angle 154 is 25° and each second sector angle 158A, 158B is 32.5°. In this embodiment, R1=1.521 inches (38.6237 mm), R2=1.436 inches (36.4744 mm), W1=0.035 inches (0.889 mm) and W2=0.0175 inches (0.445 mm). Also, the widest air gap would be at point D. The distance between points A and D is 1.50 inches (38.10 mm). With R1=1.521 inches (38.6237 mm), the difference in the air gap at R1 and the air gap at D is that the air gap at D would be 0.021 inches (0.52 mm) larger than the air gap at R1.

As shown particularly in FIGS. 4-5, in one embodiment it is contemplated that the end regions 124 of the magnets are located within the second core sectors 156 and the middle region 122 of the magnets are located with the first core sector 152. This configuration tends to balance the magnetic lines of flux thereby reducing cogging. In the specific embodiment of FIGS. 4-5 having two second core sectors 156, the end regions 124 of the magnets are located within both second core sectors 156. It is also contemplated that the end regions 124 may be located in only one of the second core sectors 156 or, alternatively, that the end regions 124 may be located in both the first and second core sectors. In this configuration, the slots 107, 108 for the magnet are placed such that W3=0.057 inches (1.45 mm) and R3=1.379 inches (35.02 mm).

Referring to FIG. 4, each magnet 110 comprises an arc shaped magnet having a radial inner surface 118 (e.g., a convex surface facing axis A) defined by a radius R4 and a radial outer surface 120 (e.g., a concave surface facing away from axis A) defined by a radius R5<R4. Each magnet 110 further comprises a middle region 122 between the radial inner surface 118 and the radial outer surface 120 and two end regions 124 between the radial inner surface 118 and the radial outer surface 120 on opposite sides of the middle region 122 (see FIG. 2). In the embodiment as illustrated in FIG. 2, the middle region 122 is wider in a radial direction than the end regions 124 so the R4 and R5 do not have the same center point. In the embodiment as illustrated in FIG. 4, the middle region 122 has the same width in a radial direction as the end regions 124 so the R4 and R5 have the same center point. In the embodiment illustrated in FIG. 4, it is contemplated that R5=1.60 inches (40.55 mm) and R4=2.14 inches (54.35 mm).

In yet another embodiment, the present invention is a method of manufacturing the IPM motor 100 including rotor 102 and stator 104 comprising:
- providing the stator 104 having a circular opening,
- providing the rotor 102 comprising a core rotatable in the stator opening about a central longitudinal axis A of the core,
- providing slots 107, 108 in the core spaced radially outward from the central longitudinal axis, and
- positioning magnets 110 in the slots.

The core is manufactured to have an outer surface contour as viewed in a cross section of the core taken in a plane perpendicular to the central longitudinal axis A. The outer surface contour 126 is manufactured to comprise a number of first outer surface segments 128, 128A, 138, 138A curved on arcs 130 centered on the central longitudinal axis A to provide uniform air gaps between the first outer surface segments and respective teeth 150 portions of the stator 104 defining the circular stator opening, and a number of second outer surface segments 132, 132A, 140 and 140A configured to provide non-uniform air gaps between the second outer surface segments and respective teeth 150 portions of the stator 104 defining the circular stator opening. Each uniform air gap is manufactured to have a gap width W2 which remains substantially constant along an entire length of the air gap, and each non-uniform air gap is manufactured to have a gap width W1 which varies along the length of the air gap.

It is contemplated that aspects of the embodiments described above may be combined in numerous ways without deviating from the invention.

The above description is also applicable to other motor configurations such as inside out motors and/or motors having windings in the rotor and permanent magnets in the stator, and visa versa. Magnet configurations and air space considerations are similar to those of the above described rotor designs.

The description refers to an IPM motor rotor throughout, but one skilled in the art knows that an electric motor may be configured as a generator.

Having described the invention in detail, it will be apparent that modifications and variations are possible without departing from the scope of the invention defined in the appended claims.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein. For example, it is contemplated that executing or performing a particular element before, contemporaneously with, or after another element is within the scope of the various embodiments of the invention.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. An electric motor rotor comprising,
   a core adapted to be received within a cylindrical opening defined by an interior surface of a stator for rotation of the core within the cylindrical opening about a central longitudinal axis of the core,
   said core having an outer surface contour as viewed in a cross section of the core taken in a plane perpendicular to said central longitudinal axis,
   said outer surface contour consisting of:
      a number of first outer surface segments defined by first arcs centered on said central longitudinal axis and configured to provide uniform air gaps between said first outer surface segments and said interior surface of the stator,
      a number of second outer surface segments defined by second arcs not centered on said central longitudinal axis and configured to provide non-uniform air gaps between the second outer surface segments and said interior surface of the stator,
      each uniform air gap having a gap width which remains substantially constant along an entire length of the air gap, and
      each non-uniform air gap having a gap width which varies along the length of the air gap,
      wherein each second arc has a radius less than the radius of each first arc,
   slots in the core spaced radially outward from said central longitudinal axis, and magnets in the slots.

2. An electric motor rotor as set forth in claim 1, wherein the difference between the radius of the first arc and the radius of the second arc is in the range of about 0.075 inches to about 0.099 inches (about 1.91 mm to about 2.51 mm).

3. An electric motor rotor as set forth in claim 1 wherein said number of first outer surface segments includes a first pair of diametrically opposite first outer surface segments and said number of second outer surface segments includes a first pair of diametrically opposite second outer surface segments.

4. An electric motor rotor as set forth in claim 3 wherein said number of first outer surface segments includes a second pair of diametrically opposite first outer surface segments, and wherein said number of second outer surface segments includes a second pair of diametrically opposite second outer surface segments.

5. An electric motor comprising
   a stator having a circular opening, a rotor comprising a core rotatable in said stator opening about a central longitudinal axis of the core, said core having an outer surface contour as viewed in a cross section of the core taken in a plane perpendicular to said central longitudinal axis, said outer surface contour consisting of:

a number of first outer surface segments curved on arcs centered on said central longitudinal axis and configured to provide uniform air gaps between said first outer surface segments and respective portions of the stator defining said circular stator opening, a number of second outer surface segments curved on arcs not centered on the central longitudinal axis of the core and configured to provide non-uniform air gaps between the second outer surface segments and respective portions of the stator defining said circular stator opening, each uniform air gap having a gap width which remains substantially constant along an entire length of the air gap, and each non-uniform air gap having a gap width which varies along the length of the air gap, wherein each second outer surface segment has a radius less than the radius of each first outer surface segment, slots in the core spaced radially outward from said central longitudinal axis, and magnets in the slots.

6. An electric motor rotor as set forth in claim 5, wherein each second arc has a radius less than the radius of each first arc, and wherein the difference between the radius of the first arc and the radius of the second arc is in the range of about 0.075 inches to 0.099 inches (1.91 mm to 2.51 mm).

7. An electric motor rotor as set forth in claim 5 wherein said number of first outer surface segments includes a first pair of diametrically opposite first outer surface segments and said number of second outer surface segments includes a first pair of diametrically opposite second outer surface segments, and wherein said number of first outer surface segments includes a second pair of diametrically opposite first outer surface segments, and wherein said number of second outer surface segments includes a second pair of diametrically opposite second outer surface segments.

8. An electric motor as set forth in claim 5 wherein the cylindrical opening of the stator is defined by a plurality of M radially inwardly projecting teeth having a tooth pitch of 360°/M and wherein each first outer surface segment defines a first core sector having a sector angle of N.P times the tooth pitch where N is an integer and P equals 3, 4 or 5.

9. An electric motor rotor as set forth in claim 8 wherein the stator has 36 teeth and wherein the sector angle is in the range of about 14°-16°, about 24°-26°, about 34°-36° or about 44°-46°.

10. An electric motor rotor as set forth in claim 8 wherein the stator has 36 teeth and wherein the sector angle is about 15°, about 25°, about 35° or about 45°.

11. An electric motor as set forth in claim 8 wherein the end regions of the magnets are located within the first core sector and within the second core sector and the middle region of the magnets are located with the first core sector.

12. An electric motor as set forth in claim 5 wherein the core has two slots with one magnet in each slot or wherein the core has four slots with one magnet in each slot.

13. An electric motor as set forth in claim 12 wherein each magnet as viewed in a cross section of the core taken in a plane perpendicular to said central longitudinal axis comprises a radial inner surface, a radial outer surface, a middle region between said radial inner and outer surfaces, and two end regions between said radial inner and outer surfaces on opposite sides of said middle region, said middle region being wider in a radial direction than said end regions.

14. An electric motor as set forth in claim 5 wherein each non-uniform air gap tapers toward the ends of the gap.

15. An electric motor as set forth in claim 14 wherein each non-uniform air gap tapers from a maximum gap width W1 to a minimum gap width W2, and wherein W1 minus W2 is substantially equal to the constant gap width of said uniform air gap.

16. An electric motor rotor for rotation in an opening of a stator, said rotor comprising, a core having a central longitudinal axis and an outer surface spaced radially outward of the axis, said outer surface having an outer surface contour as viewed in a cross section of the core taken in a plane perpendicular to said central longitudinal axis, said outer surface contour comprising:

a number of first outer surface segments defined by arcs having a first radius centered on said central longitudinal axis and a number of second outer surface segments defined by lines arcs having a second radius not centered on said central longitudinal axis, wherein said first radius is greater than said second radius, slots in the core spaced radially outward from said central longitudinal axis, and magnets in the slots.

17. An electric motor rotor as set forth in claim 16 wherein the difference between the radius of the first arc and the radius of the second arc is in the range of about 0.075 inches to about 0.099 inches (about 1.91 mm to about 2.51 mm).

18. An electric motor rotor as set forth in claim 16 wherein said number of first outer surface segments includes a first pair of diametrically opposite first outer surface segments and said number of second outer surface segments includes a first pair of diametrically opposite second outer surface segments, and wherein said number of first outer surface segments includes a second pair of diametrically opposite first outer surface segments, and wherein said number of second outer surface segments includes a second pair of diametrically opposite second outer surface segments.

19. An electric motor rotor as set forth in claim 16 wherein said outer surface contour consists of first outer surface segments defined by arcs and second outer surface segments defined by arcs.

* * * * *

UNITED STATES PATENT AND TRADEMARK OFFICE
CERTIFICATE OF CORRECTION

| | | |
|---|---|---|
| PATENT NO. | : 7,939,982 B2 | Page 1 of 1 |
| APPLICATION NO. | : 12/244039 | |
| DATED | : May 10, 2011 | |
| INVENTOR(S) | : Gary E. Horst | |

It is certified that error appears in the above-identified patent and that said Letters Patent is hereby corrected as shown below:

column 8, claim 16, line 33:
"lines arcs having a second radius not centered on said" should read
--arcs having a second radius not centered on said--.

Signed and Sealed this
Seventh Day of February, 2012

David J. Kappos
*Director of the United States Patent and Trademark Office*